F. F. FARNHAM.
METHOD OF PRODUCING BLUE POWDER.
APPLICATION FILED DEC. 4, 1916.
1,299,445.
Patented Apr. 8, 1919.
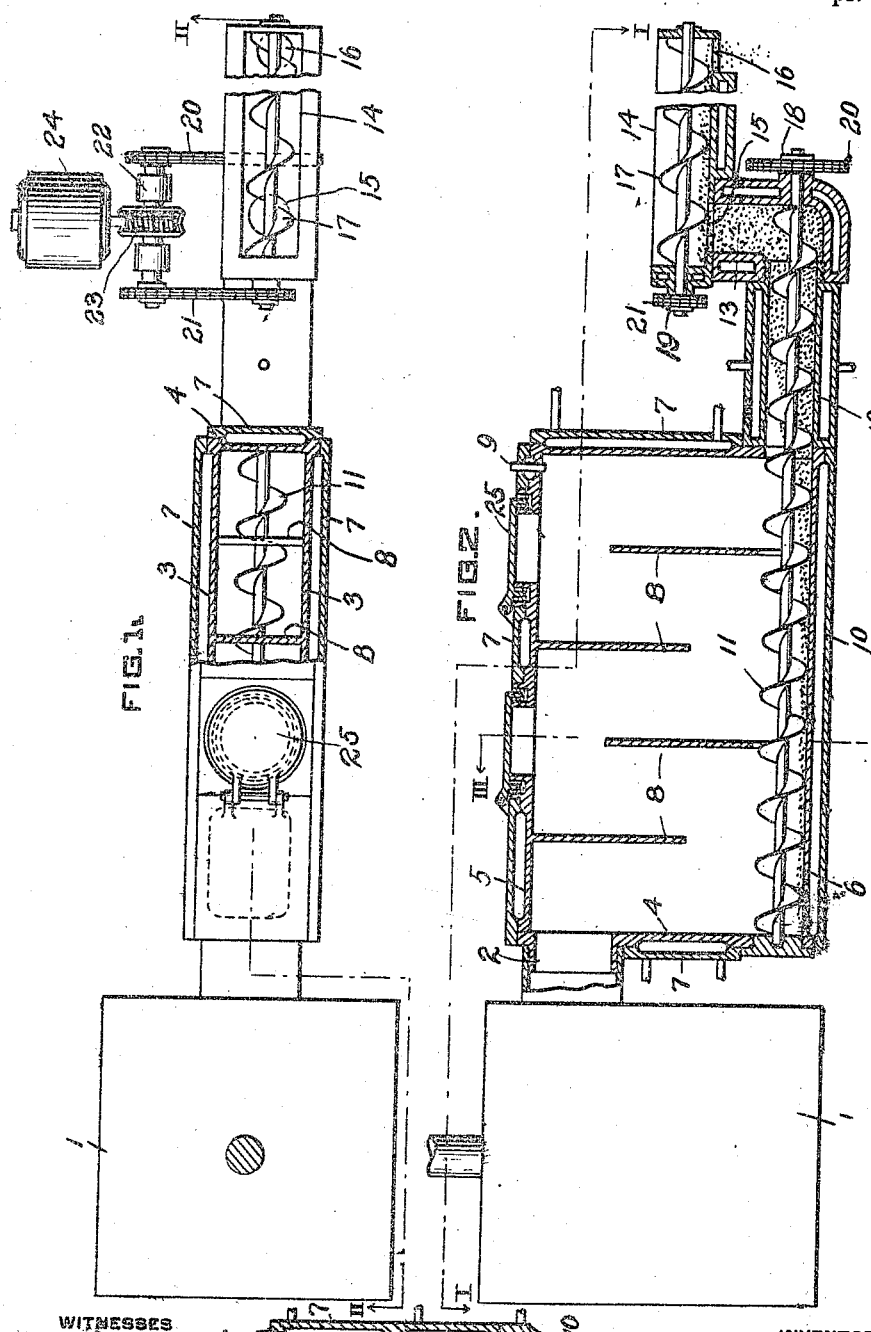

UNITED STATES PATENT OFFICE.

FREDERICK F. FARNHAM, OF FAIROAKS, PENNSYLVANIA, ASSIGNOR TO NATIONAL METAL MOLDING COMPANY, OF PITTSBURGH, PENNSYLVANIA, A CORPORATION OF PENNSYLVANIA.

METHOD OF PRODUCING BLUE POWDER.

1,299,445.  Specification of Letters Patent.  Patented Apr. 8, 1919.

Application filed December 4, 1916. Serial No. 135,021.

*To all whom it may concern:*

Be it known that I, FREDERICK F. FARNHAM, residing at Fairoaks, in the county of Allegheny and State of Pennsylvania, a citizen of the United States, have invented or discovered certain new and useful Improvements in Methods of Producing Blue Powder, of which improvements the following is a specification.

My invention relates to the manufacture of what is commercially known as "blue powder," a zinc dust consisting of minute particles of zinc coated with a film of zinc oxid.

As is well known, blue powder, and also metallic zinc or spelter, are obtained by first heating commercial zinc oxid and carbon in a retort or electrical furnace to such temperature that the zinc is vaporized and the carbon combined with the oxygen to form carbon monoxid, and then condensing the zinc vapor. Also, the different chemical and physical conditions necessary to condense the zinc vapor into either spelter or blue powder are well known. Although apparatus has been suggested for the production of blue powder exclusively, most of the blue power heretofore used has been obtained as a by-product or as an undesirable attendant in the manufacture of spelter.

It is the object of my invention to provide a method of producing blue powder whereby it may be produced continuously and in large quantities.

In the accompanying sheet of drawings, which form part of my specification, I have illustrated an apparatus whereby the method may be practised. Figure 1 is a combined plan and horizontal sectional view of the complete apparatus, the plane of view being indicated by the broken line I—I, Fig. 2; Fig. 2 is a combined side elevation and vertical sectional view taken on the line II—II Fig. 1; and Fig. 3 a transverse sectional view taken on the line III—III, Fig. 2.

In the practice of my invention the zinc fumes may be generated in any desired form of retort or furnace, but are preferably generated in an electric arc furnace 1 which may be of any suitable or well known form. As is well known such fumes are usually evolved by heating, in a non-oxidizing atmosphere and to a temperature of approximately 2500 degrees F., a mixture of commercial zinc oxid and carbon which may be in the form of coke. The products of the resulting reaction are zinc vapor and carbon monoxid. In the apparatus shown herein this mixture flows from the furnace 1 through the inlet pipe 2 to the condenser, the temperature of which is maintained at such point as will suddenly cool and condense the zinc vapor into blue powder, the essential conditions for this purpose being well known.

The condenser may be of any desired form or shape. That shown herein is rectangular in vertical and horizontal cross section, and comprises vertical side and end walls 3 and 4, top 5 and bottom 6. To quickly condense the zinc fume into blue powder, the top, side and end walls of the condenser are provided with jackets 7 between which and such walls a cooling medium, preferably water, may be caused to flow. Furthermore, means are provided, preferably in the form of alternately arranged baffle plates 8, to precipitate the blue powder to the bottom of the casing. As thus arranged these plates cause the gases and vapors to flow in a circuitous path in the interior of the condenser casing, the carbon monoxid and such foreign gases and vapors as may be mixed therewith finally escaping from an outlet 9. The top of the casing is provided with suitable water sealed explosion doors 25 hinged at one side, the purpose of which is well understood.

By using the apparatus just described blue powder may be continuously produced in large quantities. My invention is directly related to such production, and resides primarily in the treatment of the blue powder, subsequent to its condensation and upon the removal of the blue powder from the condenser casing. Three considerations are here involved. Manifestly, in view of its continuous production, the removal of the blue powder must be continuous or substantially so. In the first place then, the blue powder must be adequately cooled, prior to its removal from the condenser casing so that oxidation will not occur when the blue powder is exposed to the atmosphere; secondly, to prevent explosions in the condenser chamber, the blue powder must be removed in such a manner as to prevent the flow of air into the casing; and finally the blue powder, as it is exposed to the atmosphere, must be agitated to free the carbon monoxid and other gases entrained therein. With respect to the last point I have discovered that, when blue powder is produced in large quantities and stored without the removal of its entrained carbon monoxid and other gases arising from impurities mixed with the furnace charge, oxidation of the blue powder will usually take place.

For the purpose of cooling the blue powder prior to its removal from the casing various means may be used. In the apparatus shown herein I provide the bottom 6 of the casing with a jacket 10 for the circulation of water or other cooling medium, and I agitate the blue powder, as by means of a conveyer 10, to bring the entire mass thereof in contact with cooled bottom.

The blue powder is preferably removed through a conduit projecting from the bottom of the casing, such removal being effected partly by the conveyer 10 and partly by an instrumentality presently to be explained. While the conduit may be of any suitable shape, it preferably consists of a closed horizontal portion 12, a closed portion 13 projecting laterally, preferably vertically, from the outer end of the portion 12, and a horizontal open-topped portion 14 projecting from the portion 13 and provided at its opposite ends with an intake 15 and an outlet 16. The open-topped portion of the conduit is provided with a screw conveyer 17, adapted, when operating to carry the blue powder from the intake 15 to the outlet 16, to agitate the blue powder to free it from carbon monoxid. As will be seen, the walls of the several conduit portions are jacketed for the circulation of water or other cooling medium.

As will be seen, the arrangement is such that, in the outer end of the conduit portion 12 and throughout the entire extent of the portion 13, the blue powder fills the entire otherwise unclosed cross-sectional area of the passageway, thus affording an adequate seal against the ingress of air into the condensing chamber.

For driving the conveyers 11 and 17 their shaft ends project through the ends of the conduit portions 12 and 14 and are provided with sprocket wheels 18 and 19, respectively. These sprockets, by means of chains 20 and 21, shaft 22, and worm gear 23, may be simultaneously driven by a motor 24.

According to the provisions of the patent statutes, I have described the principle and operation of my invention together with the apparatus which I now consider to represent the best embodiment thereof. However, I desire it to be understood that my invention may be practised by other forms of apparatus than that specifically shown and described.

I claim as my invention:

1. The method of producing blue powder from highly heated zinc fume, consisting of continuously condensing in a closed chamber a stream of such fume to blue powder, cooling the blue powder to a temperature below that at which it will ignite when exposed to the atmosphere, and thereafter continuously removing the cooled blue powder from the condensing chamber.

2. The method of producing blue powder from highly heated zinc fume, consisting of continuously condensing in a closed chamber a stream of such fume to blue powder, cooling the blue powder to a temperature below that at which it will ignite when exposed to the atmosphere, thereafter continuously removing the cooled blue powder from the condensing chamber, and simultaneously with such removal agitating the blue powder to free it of entrapped carbon monoxid.

In testimony whereof I have hereunto set my hand.

FREDERICK F. FARNHAM.

Witnesses:
M. M. O'BRIEN,
FRANCIS J. TOMASSON.